(12) United States Patent
Wolterink et al.

(10) Patent No.: US 11,048,067 B2
(45) Date of Patent: Jun. 29, 2021

(54) LENS SYSTEM

(71) Applicant: Anteryon International B.V., Eindhoven (NL)

(72) Inventors: Edwin Maria Wolterink, Eindhoven (NL); Yelena Vladimirovna Shulepova, Eindhoven (NL)

(73) Assignee: Anteryon International B.V., Eindhoven (NL)

( * ) Notice: Subject to any disclaimer, the term of this patent is extended or adjusted under 35 U.S.C. 154(b) by 273 days.

(21) Appl. No.: 16/416,492

(22) Filed: May 20, 2019

(65) Prior Publication Data

US 2019/0361205 A1 Nov. 28, 2019

Related U.S. Application Data

(60) Provisional application No. 62/676,376, filed on May 25, 2018.

(30) Foreign Application Priority Data

May 25, 2018 (NL) ...................................... 2020987

(51) Int. Cl.
*G02B 13/00* (2006.01)
*G02B 9/34* (2006.01)
*G02B 9/12* (2006.01)

(52) U.S. Cl.
CPC ........... *G02B 13/0085* (2013.01); *G02B 9/12* (2013.01); *G02B 9/34* (2013.01)

(58) Field of Classification Search
CPC ........ G02B 13/0085; G02B 9/34; G02B 9/12; G02B 13/006; G02B 3/08; G02B 13/0035; G02B 1/10; G02B 3/00

USPC .......................................................... 359/780
See application file for complete search history.

(56) References Cited

U.S. PATENT DOCUMENTS

| | | | |
|---|---|---|---|
| 5,978,151 | A | 11/1999 | Hagimori |
| 2005/0259333 | A1 | 11/2005 | Matsusaka |
| 2005/0275954 | A1 | 12/2005 | Bloemen et al. |
| 2005/0286138 | A1 | 12/2005 | Matsusaka |
| 2006/0066961 | A1 | 3/2006 | Sato et al. |
| 2007/0275505 | A1 | 11/2007 | Wolterink et al. |
| 2008/0118241 | A1 | 5/2008 | TeKolste et al. |
| 2009/0310232 | A1 | 12/2009 | Kudou |
| 2011/0102660 | A1 | 5/2011 | Mihara et al. |
| 2011/0124373 | A1 | 5/2011 | Fukuta |

(Continued)

FOREIGN PATENT DOCUMENTS

| | | |
|---|---|---|
| EP | 2113800 A1 | 11/2009 |
| EP | 2113802 A1 | 11/2009 |

(Continued)

*Primary Examiner* — Mohammed A Hasan
(74) *Attorney, Agent, or Firm* — Wood, Phillips, Katz, Clark & Mortimer

(57) ABSTRACT

The present invention relates to an optical unit comprising three lens groups, i.e., a first lens group, a second lens group and a third lens group, and an optical unit comprising four lens groups, i.e., a first lens group, a second lens group a third lens group and a fourth lens group, which are arranged in order from an object side toward an image side surface side, wherein one or more of said lens groups comprise a substrate having a curved optical surface, wherein said curved optical surface is provided with a polymer layer.

60 Claims, 7 Drawing Sheets

(56) References Cited

U.S. PATENT DOCUMENTS

| | | |
|---|---|---|
| 2012/0081595 A1 | 4/2012 | Uchida |
| 2012/0194926 A1* | 8/2012 | Kubota .................... G02B 9/34 |
| | | 359/773 |
| 2013/0265459 A1 | 10/2013 | Duparre et al. |

FOREIGN PATENT DOCUMENTS

| | | |
|---|---|---|
| EP | 2116882 A1 | 11/2009 |
| EP | 2163931 A1 | 3/2010 |
| JP | 2009251210 A | 10/2009 |
| WO | 2009048320 A1 | 4/2009 |
| WO | 2013157470 A1 | 10/2013 |
| WO | 2015080582 A1 | 6/2015 |

* cited by examiner

| Surf | Type | Radius | Thickness | Glass | Diameter | Conic | Comment |
|---|---|---|---|---|---|---|---|
| OBJ | STANDARD | Infinity | Infinity | | 0 | 0 | |
| 1 | EVENASPH | 1,532433 | 0,238799 | NA02 | 2,38 | 0 | Lens1 A |
| 2 | STANDARD | 1,734685 | 0,678271 | N-FK51 | 2,38 | 0 | Lens1 B |
| STO | STANDARD | Infinity | 0,176848 | MP10 | 2,38 | 0 | Lens1 C |
| 4 | EVENASPH | 6,012303 | 0,51643 | | 1,826493 | 2,505869 | |
| 5 | EVENASPH | -4,36335 | 0,177751 | MP10 | 1,964043 | -2,79438 | Lens2 A |
| 6 | STANDARD | Infinity | 1,23586 | BACD14 | 3,24 | 0 | Lens2 B |
| 7 | STANDARD | -2,16773 | 0,47668 | NA02 | 3,24 | 0 | Lens2 C |
| 8 | EVENASPH | -1,66295 | 0,511745 | | 3,24 | -1,86523 | |
| 9 | EVENASPH | -8,06346 | 0,316391 | NA02 | 3,314355 | 1,770205 | Lens3 A |
| 10 | STANDARD | Infinity | 0,268255 | BA15 | 4,86 | 0 | Lens3 B |
| 11 | EVENASPH | 1,671874 | 0,549662 | | 4,86 | -9,69527 | |
| 12 | STANDARD | Infinity | 0,3 | B270 | 5,5 | 0 | Cover glass |
| 13 | STANDARD | Infinity | 0,05 | | 5,5 | 0 | |
| IMA | STANDARD | Infinity | | | 5,5 | 0 | Sensor |

5.5 mm total

Total track/sensor diagonal= 5.5/5.5 = 1

Fig. 6

| Surf | Type | Radius | Thickness | Glass | Diameter | Conic | Comment |
|---|---|---|---|---|---|---|---|
| OBJ | STANDARD | Infinity | | | 0 | 0 | |
| 1 | EVENASPH | 1,784592 | 0,07461107 | NA02 | 2,84 | -1,349929 | Lens1 A |
| 2 | EVENASPH | 1,99871 | 0,6939659 | N-FK51 | 2,8 | 0 | Lens1 B |
| 3 | STANDARD | Infinity | 0,0875 | MH03 | 2,6 | 0 | Lens1 C |
| 4 | EVENASPH | 14,51377 | 0,08073318 | | 2,42 | -0,8211209 | Lens2 A |
| 5 | EVENASPH | 4,891194 | 0,03 | NA02 | 2,06 | -5,836426 | Lens2 B |
| 6 | EVENASPH | 3,118757 | 0,3049661 | H-ZLAF52 | 1,94 | 0 | Lens2 C |
| STO | STANDARD | Infinity | 0 | H-ZLAF52 | 1,7 | 0 | Aperture |
| 8 | STANDARD | Infinity | 0,03 | MH03 | 1,72 | 0 | Lens2 C |
| 9 | EVENASPH | 3,055333 | 0,5080909 | | 1,74 | -2,931763 | |
| 10 | EVENASPH | -3,43836 | 0,066 | MH03 | 1,86 | 11,35592 | Lens3 A |
| 11 | STANDARD | Infinity | 1,900929 | BACD14 | 2,2 | 0 | Lens3 B |
| 12 | EVENASPH | -2,145326 | 0,1 | NA02 | 3,4 | 0 | Lens3 C |
| 13 | EVENASPH | -1,707474 | 0,6270195 | | 3,46 | -0,8062844 | |
| 14 | EVENASPH | -3,84684 | 0,2138236 | BA15 | 4,06 | 0,7087171 | Lens4 A |
| 15 | STANDARD | Infinity | 0,335649 | MH03 | 4,9 | 0 | Lens4 B |
| 16 | EVENASPH | 2,969688 | 0,298036 | | 5 | -0,8579745 | |
| 17 | STANDARD | Infinity | 0,3 | B270 | 5,4 | 0 | Cover glass |
| 18 | STANDARD | Infinity | 0,1320785 | | 5,4 | 0 | |
| IMA | STANDARD | Infinity | | | 5,474786 | 0 | |

5,8 mm total

Total track/sensor diagonal= 5.8/5.5 = 1.05

Fig. 7

LENS SYSTEM

CROSS-REFERENCE TO RELATED APPLICATIONS

This application claims priority of Provisional Ser. No. 62/676,376, filed May 25, 2018 and Netherlands Appln. No. 2020987, filed May 25, 2018, the disclosures of which are hereby incorporated by reference in their entirety.

FIELD OF THE INVENTION

The present invention relates to a lens system, more in particular to optical unit comprising three lens groups, i.e., a first lens group, a second lens group and a third lens group, which are arranged in order from an object side toward an image side surface side. The present invention also relates to a lens system, more in particular to optical unit comprising four lens groups, i.e., a first lens group, a second lens group, a third lens group and a fourth lens group, which are arranged in order from an object side toward an image side surface side.

BACKGROUND OF THE INVENTION

Lens systems as such are known and widely used in, inter alia, mobile phones, tablets and compact cameras. The picture quality (resolution) of current cameras used in those handheld devices is relative poor, especially in the corners of images. Although the lens designs used in abovementioned cameras show that very high corner resolution should be possible to achieve in the nominal case, the actual measured resolution is usually significantly lower than the nominal design.

US 2011/124373 relates to an image pickup lens comprising four or more lens blocks, wherein each of the lens blocks is an optical element comprising a lens substrate being a parallel flat plate, and a lens portion or lens portions having positive or negative power and formed on at least one of an object-side surface and image-side surface of the lens substrate, the lens substrate is different in material from the lens portion or lens portions in each of the lens blocks, the lens blocks include, in order from an object side, a first lens block, a second lens block, a third lens block, and a fourth lens block, the first lens block has positive power, the second lens block has negative power, a lens block arranged at a closest position to an image side has a concave shape facing the image side in a paraxial region. All of the lens substrates are parallel flat plates having a same thickness and each of the lens substrates is formed of a glass material.

WO 2013/157470 relates to a microscope objective lens wherein the maximum inclination (CRA) of a principal ray between a microscope objective lens and an imaging lens satisfies a conditional expression.

US 2012/081595 relates to an image taking optical system comprising, in order from the object side: a first lens having a biconvex shape and having a positive refractive power; a second lens having a meniscus shape with a concave surface facing the object side and having a negative refractive power; a third lens having a negative refractive power; a fourth lens having a meniscus shape with a concave surface facing the object side and having a positive refractive power; and a fifth lens having a negative refractive power, wherein the first lens and the second lens are cemented together.

EP 2 113 800 relates to an image pickup lens, where a lens group is assumed to comprise a lens substrate being a parallel flat plate and a lens or lenses formed on at least one of an object side surface and image side surface of the lens substrate, the image pickup lens comprising: the lens group in which lenses are formed on both sides of the lens substrate.

EP 2 116 882 relates to an imaging lens comprising: at least one lens block including a lens substrate that is a plane-parallel plate, and a lens contiguous with at least one of object-side and image-side substrate surfaces of the lens substrate, the lens exerting a positive or negative optical power; and an aperture stop restricting light amount, wherein the lens included in the lens block is formed of a material different from a material of which the lens substrate is formed; wherein the lens block comprises a first lens block disposed at a most object-side position, the first lens block exerting a positive optical power, and wherein the lens block comprises at least one lens block in which the lens is contiguous only with one of the object-side and image-side substrate surface of the lens substrate, wherein the lens substrate is formed of glass and the lens is formed of resin.

EP 2 113 802 relates to an imaging lens comprising: at least one lens block including a lens substrate that is a plane-parallel plate, and a lens contiguous with at least one of object-side and image-side substrate surfaces of the lens substrate, the lens exerting a positive or negative optical power; and an aperture stop restricting light amount, wherein the lens included in the lens block is formed of a material different from a material out of which the lens substrate is formed; wherein the lens block comprises a first lens block disposed at a most object-side position, the first lens block including, as the lens substrate, a first lens substrate, and as the lens, a lens L[LS1o] contiguous with an object-side substrate surface of the first lens substrate, wherein the lens substrate is formed by cementing together two flat-plate-shaped glass pieces, and wherein the aperture stop is located at a cemented surface between the flat-plate-shaped glass pieces.

EP 2 163 931 relates to an imaging lens, comprising: a first lens having a positive refracting power and facing an object; a second lens which is provided on an image side of the first lens and has a concave shape toward an object side; and at least one lens or more provided on the image side of the second lens, wherein lenses can be generated at one time by irradiating UV light after a lens element has been formed on a glass plate.

US 2009/310232 relates to an imaging lens comprising: a first lens group that includes sequentially from an object side, a first lens formed of resin and having a positive refractive power and a second lens formed of resin and having a negative refractive power, the first lens and the second lens collectively forming a cemented lens having a positive refractive power; a second lens group that includes a negative lens; a third lens group that includes a positive lens, wherein the first lens group, the second lens group, and the third lens groups are sequentially arranged from the object side.

US 2008/118241 relates to a camera system, comprising an optics stack including two substrates secured together in a vertical direction and an optical system on the two substrates, the two substrates having exposed sides; a detector on a detector substrate, and a stray light blocker directly on at least some sides of the optics stack.

US 2005/259333 relates to a variable power optical system, that forms an optical image of an object on a light receiving surface of an image sensor for converting an optical image into an electric signal and changing gaps between lens groups in an optically axial direction so as to vary power, said optical system including from an object side: a first lens group having negative optical power, a second lens group having positive optical power; and a third lens group, wherein when the power is varied from a wide-angle end to a telephoto end, the gap between the first lens group and the second lens group is narrowed, the first lens group is composed of two or more lenses, at least three lens groups are composed only a single lens or a lens where countered lens surfaces in the lens group are in close contact with each other without providing a gap.

US 2005/286138 relates to a variable magnification optical system which forms optical images of objects on the light-receptive surface of an image pickup device for converting optical images into electrical signals and performs magnification by varying the spacing of respective lens groups in the optical axis direction, said optical system comprising from the object side: a first lens group including plural lenses and at least one aspherical surface and having a negative optical power; and a second lens group having a positive optical power, wherein the spacing between the first lens group and the second lens group is reduced for magnification from the wide-angle end to the telephoto end.

U.S. Pat. No. 5,978,151 relates to an optical system comprising: a plurality of lens elements; and a lens block constituting one or more lens elements in the optical system, wherein an extent of curvature of field asymmetricity in two or more directions is detected by using an off-axial rays that have passed through the lens block and wherein a position of the lens block is adjusted such that the curvature of field asymmetricity is reduced to a minimum.

US 2011/102660 relates to an image forming optical system comprising in order from an object side: a lens group B having a negative refracting power; a lens group C having a positive refracting power; and one or two more lens groups additionally, wherein the lens group C moves only toward the object side at the time of zooming from a wide angle end to a telephoto end, and a lens component which is used in the lens group B.

JP 2009 251210 relates to a lens block that is a parallel flat plate and a lens that has a positive power or a negative power that is continuous with at least one of the object side substrate surface and the image side substrate surface of the lens substrate, the lens is made of a resin different from the material of the lens substrate.

US 2013/265459 relates to a camera array, wherein the optics of each camera comprise a five-surface optical arrangement comprising: a first lens element having a first convex proximal surface and a first concave distal surface, wherein the diameter of the first convex surface is larger than the diameter of the first concave surface; a second lens element having a second concave proximal surface and a second convex distal surface, wherein the diameter of the second concave proximal surface is smaller than the diameter of the second convex surface; a third lens element having a third concave proximal surface and a third planar distal surface, wherein the diameter of the third concave proximal surface is larger than the diameters of any of the surfaces of the first and second lens elements; and wherein the first, second and thirds lens elements are arranged sequentially in optical alignment with an imager positioned at the distal end thereof. The optics of each camera are configured so that each camera has a field of view that is shifted with respect to the field-of-views of the other cameras so that each shift includes a sub-pixel shifted view of the scene.

US 2006/066961 relates to an aspherical lens composed of a substrate member and a member having different composition formed on the substrate member, a boundary between the substrate member and the member having different composition being formed by a first aspherical surface, a surface of the member having different composition opposite to the boundary being formed by a second aspherical surface.

US 2007/275505 relates to a wafer scale package comprising a base substrate having a plurality of image capturing elements, wherein the wafer scale package further comprises a lens substrate having a plurality of lens elements associated with respective image capturing elements, and a spacer means for maintaining a predetermined distance between the lens substrate and the base substrate, whereby the position of the lens substrate relative to the base substrate is fixated by means of an adhesive layer.

US 2005/275954 relates to an optical scanning device for scanning an information layer of an optical record carrier, the information layer being covered by a transparent layer of thickness and refractive index, the device comprising a radiation source for generating a radiation beam and an objective system for converging the radiation beam on the information layer, the objective system comprises a lens comprising a synthetic resin on a substrate, WO 2015/080582 relates to an optical unit consisting of four lens groups, i.e., a first lens group, a second lens group, a third lens group and a forth lens group, which are arranged in order from an object side toward an image side surface side, wherein at least the first and second lens group comprise two lens elements, wherein said two lens elements within each lens group have different optical properties, wherein in both the first lens group and the second lens group no glass substrate is present.

The present inventors found that, on a large degree, the resolution degradation is caused by production tolerances in lens manufacturing resulting in decenter deviations up to 5 micrometers, and by tilt of the lens caused by the autofocus system. In addition, it is possible to make a design that is more robust to tolerances. So given production tolerances, by making a more robust design, production tolerances such as decenter will have a limited effect on resolution degradation.

One possible solution is that in current plastic molding lens technology, a more robust design would be possible by relocation the diaphragm from the front towards the middle of the lens system. However, this would result in very thin lenses (<200-300 um), which cannot be manufactured by injection molding. Another disadvantage of relocation of the diaphragm is that the nominal design performance gets lower.

Nowadays the trends in cameras for hand-held devices can be identified as follows: higher resolution, higher Mpix count, smaller pixels, lower z-height and higher field of views (from 55 deg to 70 deg).

The consequences of these trends are: optics in cameras require changes in designing the optics for the cameras: low F# and more lens elements are needed, low F# and more lens elements require tighter production tolerances. Lens systems will show an increased sensitivity to manufacturing tolerances such as lens decenter, lens shape deviations and lens tilt. This will be visible in—for example—a low corner resolution, and/or non-uniformity of the resolution in the pictures taken with these cameras. In addition lens performance is highly determined by manufacturing tolerances. The main production tolerances that lead to lower image quality and/or non-uniformity are lens decenter and lens tilt. Typical manufacturing tolerances for injection molding for decenter are typically 3-5 microns. In order to keep the performance degradation to an acceptable low level, typical maximum decenter of 1 micron would be required, which is beyond current manufacturing capability.

SUMMARY OF THE INVENTION

An object of the present invention is thus to develop lens designs that are more robust to tolerances, especially regarding to manufacturing tolerances.

Another object of the present invention is to develop such robust lens designs while maintaining nominal performance.

Another object of the present invention is to provide high performing lens designs showing high level of chromatic properties of the lens, especial aberration, especially chromatic aberration (CA), in a wide temperature range allowing new ways of choosing the lens configuration.

Another object of the present invention is to provide high performing lens designs providing a high level of image quality.

Another object of the present invention is to provide high performing lens designs having small dimensions while maintaining nominal performance.

The present invention relates thus to an optical unit comprising three lens groups, i.e., a first lens group, a second lens group and a third lens group, which are arranged in order from an object side toward an image side surface side, wherein one or more of said lens groups comprise a substrate having a curved optical surface, wherein said curved optical surface is provided with a polymer layer.

In an embodiment of the present optical unit the first lens group and the second lens group each comprise a curved substrate having a curved surface.

In an embodiment of the present optical unit the curved substrate is made of glass. The thermal expansion coefficient of glass is substantially lower than the thermal coefficient of a polymer, for example in a range of >10 times.

An example of a substrate having a curved optical surface is a lens body wherein at least one surface is a spherical surface. In another embodiment of a lens body one surface is a flat surface and the other surface is a spherical surface. In another embodiment a lens body has two spherical surfaces.

The present inventors found that the ratio between the Z-height and the length of the diagonal of the image sensor in a stack according to the present invention is lower than 1.1. According to the present invention the afore mentioned ratio is higher than 0.9. If the ratio is higher than 1.1 the dimension of the stack becomes too large, i.e., the thickness is too high for practical applications, such as mobile devices, for example smartphones. If the ratio is lower than 0.9, the MTF will be deteriorated, especially at the corners. In addition, the tolerance sensitivity will be high. The discussed ratio here is (Z height)/(length of the diagonal of the image sensor). The present ratio is much different from the ratio to be calculated from the disclosure of the above discussed US 2013/265459. In US 2013/265459 the ratio is higher than 1.2. The parameter Z-height is the distance between the first lens surface and the image sensor.

In the examples disclosed herein the Z-height of an optical unit consisting of four lens groups is about 5.8 mm en the value of the Z-height for an optical unit consisting of three lens groups is about 5.5 mm. The corresponding ratio between the Z-height and the length of the diagonal of the image sensor, i.e., total track/sensor diagonal, is equal to 5.5/5.5 (=1) for an optical unit consisting of three lens groups. The corresponding ratio between the Z-height and the length of the diagonal of the image sensor, i.e., total track/sensor diagonal, is equal to 5.8/5.5 (=1.05) for an optical unit consisting of four lens groups.

In an embodiment of the present optical unit comprising three lens groups the polymer layer has been manufactured according replication technology. The present the first lens group and the second lens group are preferably groups of contiguous lens elements cemented together by replication technology according to WO 2009/048320 A1 and in preferred embodiments they contain additional integrated intermediate substrates, filters and diaphragms. Injection molded type lenses can be used as well. The contents of WO 2009/048320 are considered to be incorporated here in its entirety.

In an embodiment of the present optical unit the thickness of at least one of said polymer layers is in a range of 10-300 micro meter, preferably in a range of 25-200 micro meter.

In an embodiment of the present optical unit the first lens group further comprises another polymer layer, the polymer layer positioned adjacent to the curved substrate facing away from the curved surface. In such an embodiment the lens body or substrate of the first lens group is embedded between two polymer layers. In an embodiment of a lens body having a flat surface and a curved surface, both the flat surface and the curved surface is provided with a polymer layer.

In an embodiment of the present optical unit the second lens group further comprises another polymer layer, the polymer layer positioned adjacent to the curved substrate facing away from the curved surface. In such an embodiment the lens body or substrate of the second lens group is embedded between two polymer layers. In an embodiment of a lens body having a flat surface and a curved surface, both the flat surface and the curved surface is provided with a polymer layer.

In an embodiment of the present optical unit the additional polymer layer(s) as mentioned above has been manufactured according replication technology as well, for example by replication technology according to WO 2009/048320 A1.

In an embodiment of the present optical unit comprising three lens groups the third lens group comprises two lens elements, wherein the two lens elements within the third lens group have different optical properties, wherein in the third lens group no glass substrate is present.

In the present optical unit comprising three lens groups the third lens group can be identified as a wafer level optics bimaterial lens system, the third lens group being an assembly of at least two contiguous lens elements comprising at least two different lens materials having different optical properties.

The present term "bimaterial lenses" refers to the use of two different materials in one lens, e.g. a lens element X made of material Q (e.g. photo curable epoxy resin) and a lens element Z (e.g. photo curable acrylic resin) made of material P, wherein both lens element X and lens element Y form together a lens.

In an embodiment of the present optical unit comprising three lens groups each of the two lens elements within said third lens group have been manufactured according replication technology.

In an embodiment of the present optical unit comprising three lens groups no flat glass support is present in at least one or more of the first, second and third lens groups.

In a preferred embodiment of the present invention the optical unit comprises a first lens group, comprising a first lens body having a curved optical surface and a flat surface, the first lens body being made of glass, wherein both the curved optical surface and the flat surface is provided with a polymer layer, a second lens group, comprising a second lens body having a curved optical surface and a flat surface, the second lens body being made of glass, wherein both the curved optical surface and the flat surface is provided with a polymer layer, and a third lens group being an assembly of at least two contiguous lens elements comprising at least two different lens materials having different optical properties. In such an embodiment no flat glass support is present in the first, second and third lens groups.

In another embodiment the present optical unit further comprises at least one additional lens group that is positioned between any one of the first and second lens group, and the second and third lens group. Such an additional lens group is preferably positioned the first lens group and the second lens group. In an embodiment the additional lens group comprises a curved substrate having a curved surface, wherein the curved optical surface is provided with a polymer layer, wherein the curved substrate is preferably made of glass.

In an embodiment of an optical unit according to the present invention there is no flat glass support present in at least one or more of said first, second, third and additional lens groups.

In an embodiment of the present optical unit comprising three lens groups the first lens group has a positive refraction power, especially the second lens has a positive refraction power, and especially the third lens group has a negative refraction power.

In an embodiment of the present optical unit comprising three lens groups wherein a focal length of the integral optical camera lens is f, a focal length of said first lens group is f1, a focal length of said second lens group is f2, a focal length of said third lens group is f3, the following relational expressions apply:

$$0.5 < f1/f < 1;$$

$$0.5 < f2/f < 1;$$

$$-1 < f3/f < -0.1.$$

In an embodiment of the present optical unit comprising three lens groups the range of index (n) and Abbe properties in said first lens group are:

$$1.5 < n < 1.8,\ 40 < Abbe < 80 \quad (A)$$

$$1.4 < n < 1.8,\ 60 < Abbe < 90 \quad (B)$$

(C) $1.5 < n < 1.8$, $20 < Abbe < 40$, wherein the term "A" refers to a lens element toward an object side, the term (B) refers to a curved substrate, and the term "C" refers to a lens element towards an image surface side.

In an embodiment of the present optical unit comprising three lens groups the range of index (n) and Abbe properties in said second lens group are:

$$1.5 < n < 1.8,\ 20 < Abbe < 40 \quad (A)$$

$$1.4 < n < 1.8,\ 40 < Abbe < 80 \quad (B)$$

(C) $1.5 < n < 1.8$, $40 < Abbe < 80$, wherein the term "A" refers to a lens element toward an object side, the term (B) refers to a curved substrate, and the term "C" refers to a lens element towards an image surface side.

In an embodiment of the present optical unit comprising three lens groups the range of index (n) and Abbe properties in said third lens group are:

$$1.4 < n < 1.7,\ 30 < Abbe < 60 \quad (A)$$

(C) $1.5 < n < 1.8$, $20 < Abbe < 50$, wherein the term "A" refers to a lens element toward an object side and the term "C" refers to a lens element towards an image surface side.

The present invention also relates to a lens system, more in particular to optical unit comprising four lens groups, i.e., a first lens group, a second lens group, a third lens group and a fourth lens group, which are arranged in order from an object side toward an image side surface side.

In an embodiment of the present optical unit comprising four lens groups the first lens group has positive refraction power, especially the second lens group has positive refraction power, especially the third lens group has positive refraction power and especially the fourth lens group has negative refraction power, wherein the order from an object side toward an image side surface side is: first lens group, second lens group, third lens group and fourth lens group, said fourth lens group here being a lens group comprising two lens elements, wherein said two lens elements within said lens group have different optical properties, wherein in said third lens group no glass substrate is present, wherein said first lens group, said second lens group and said third lens group each comprise a substrate having a curved optical surface, wherein said curved optical surface is provided with a polymer layer.

In an embodiment of the present optical unit comprising four lens groups, wherein a focal length of the integral optical camera lens is f, a focal length of the first lens group is f1, a focal length of the second lens group is f2, a focal length of the third lens group is f3, a focal length of the fourth lens group is f4, the following relational expressions apply:

$$0.5 < f1/f < 0.98;$$

$$20 < f2/f < 35;$$

$$0.5 < f3/f < 1;$$

$$-1 < f4/f < -0.1;$$

For an optimum optical performance of the present optical unit several embodiments will be disclosed hereafter. The specific location of the first, second, third and fourth lens groups and the lens elements present therein will be elucidated when discussing the figures.

In an embodiment of the present optical unit comprising four lens groups the range of index (n) and Abbe properties in the first lens group are:

$$1.5 < n < 1.8,\ 40 < Abbe < 80 \quad (A)$$

$$1.4 < n < 1.8,\ 60 < Abbe < 90 \quad (B)$$

(C) $1.5 < n < 1.8$, $20 < Abbe < 40$, wherein the term "A" refers to a lens element toward an object side, the term (B) refers to a curved substrate, and the term "C" refers to a lens element towards an image surface side.

In an embodiment of the present optical unit comprising four lens groups the range of index (n) and Abbe properties in the second lens group are:

$$1.5 < n < 1.8,\ 40 < Abbe < 80 \quad (A)$$

$$1.6 < n < 1.85,\ 30 < Abbe < 50 \quad (B)$$

(C) $1.5 < n < 1.8$, $20 < Abbe < 40$, wherein the term "A" refers to a lens element toward an object side, the term (B) refers to a curved substrate, and the term "C" refers to a lens element towards an image surface side.

In an embodiment of the present optical unit comprising four lens groups the range of index (n) and Abbe properties in the third lens group are:

1.5<$n$<1.8, 20<Abbe<40 (A)

1.4<$n$<1.8, 40<Abbe<80 (B)

(C) 1.5<n<1.8, 40<Abbe<80, wherein the term "A" refers to a lens element toward an object side, the term (B) refers to a curved substrate, and the term "C" refers to a lens element towards an image surface side.

In an embodiment of the present optical unit comprising four lens groups the range of index (n) and Abbe properties in the fourth lens group are:

1.4<$n$<1.7, 30<Abbe<60 (A)

1.5<$n$<1.8, 20<Abbe<40 (C)

wherein the term "A" refers to a lens element toward an object side and the term "C" refers to a lens element towards an image surface side.

In an embodiment of the present optical units one or more additional layers may be present in one or more of the four lenses groups, the additional layers being chosen form the group of integrated intermediate substrates, IR filters, UV filters, apertures and diaphragms, or combinations thereof.

In an embodiment of the present optical units the materials of each of the polymer layer(s) are chosen from the group of UV curable polymers, preferably epoxy, acrylic and nylon type polymers.

The present invention also relates to a stack of a lens assembly, wherein the stack comprises an optical unit according to the present invention.

In an embodiment of the present stack the individual three or four lens groups from the optical unit are stacked by using spacers and/or adhesives.

In an embodiment the present stack further comprises one or more of an image sensor, a sensor cover plate and a cover plate.

The present invention will be explained by using the Figures and embodiments.

BRIEF DESCRIPTION OF THE DRAWINGS

FIG. 6 shows the optical table for an embodiment (a lens system comprising three lens groups according to the invention).

FIG. 7 shows the optical table for an embodiment (a lens system comprising four lens groups according to the invention).

Figure 1:
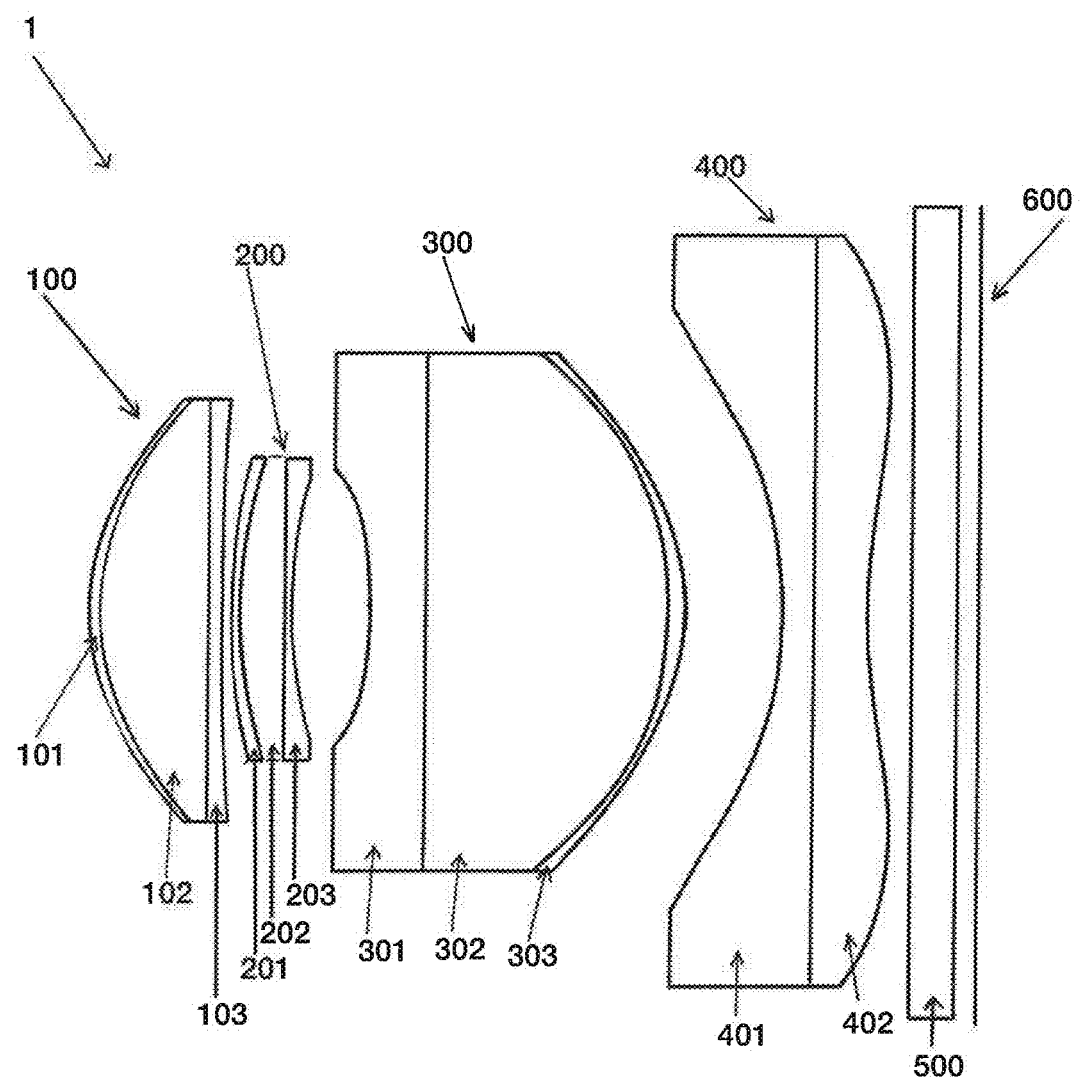
FIG. 1 shows an embodiment of a lens system comprising four lens groups according to the present invention.
Figure 4:
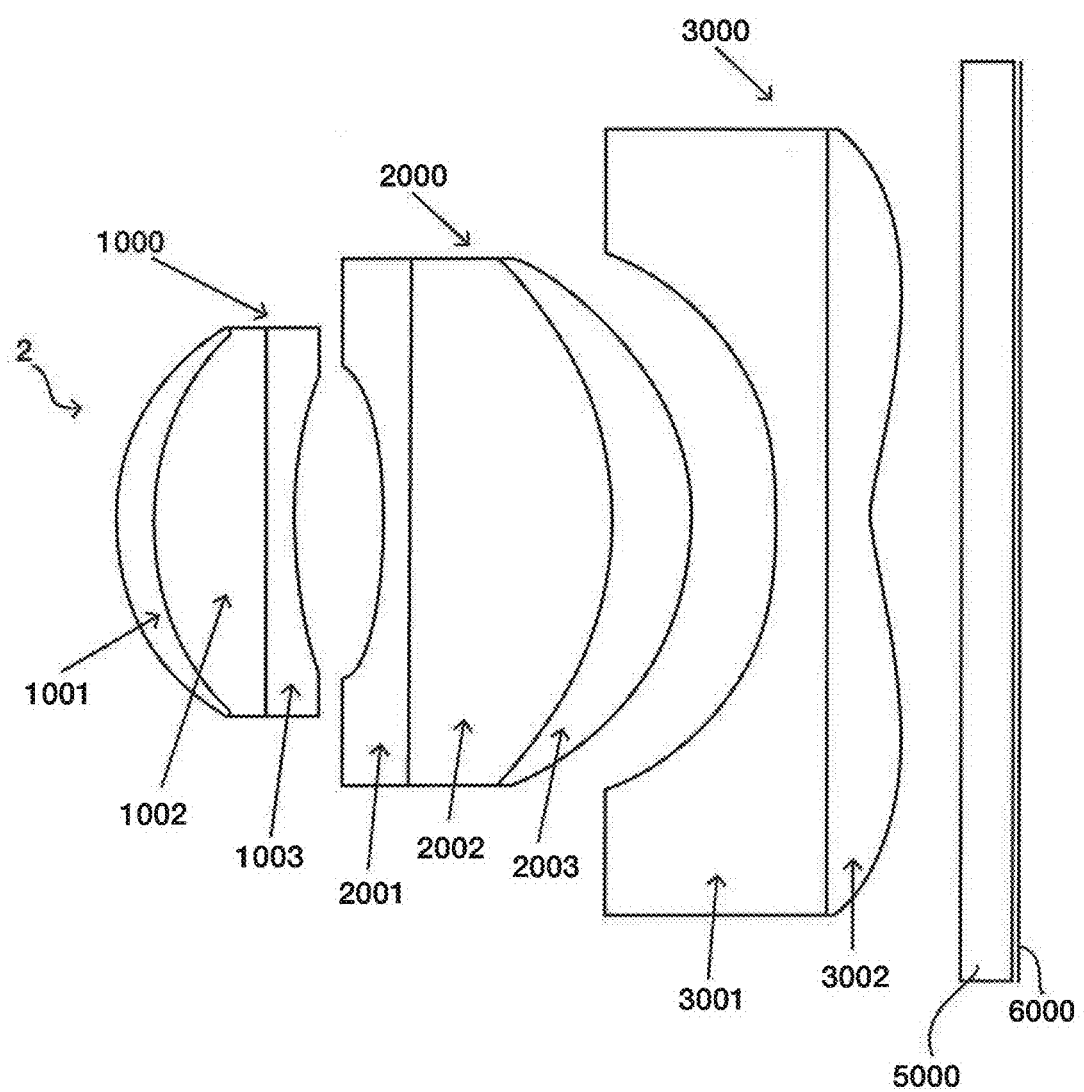
FIG. 4 shows an embodiment of a lens system comprising three lenses groups according to the present invention.

The present inventors found that the optical performance of the present optical unit is to a large extent determined by the combinations of the different lens groups (see FIG. 1 and FIG. 4).

DETAILED DESCRIPTION OF THE PREFERRED EMBODIMENT

FIG. 1 shows an embodiment of a lens system 1 comprising four lens groups 100, 200, 300 and 400 according to the present invention. The lens groups are arranged in order from an object side toward an image side surface side. The first lens group 100 (identified as Lens1) comprises material A in layer 101, material B in lens body 102 and material C in layer 103. The second lens group 200 (identified as Lens2) comprises material A in layer 201, material B in lens body 202 and material C in layer 203. The third lens group 300 (identified as Lens3) comprises material A in layer 301, material B in lens body 302 and material C in layer 303. The fourth lens group 400 (identified as Lens4) comprises material A in layer 401, material B in layer 402. Lens system 1 further comprises a cover glass 500 and an image sensor 600.

In an embodiment of the present invention lens body 102, lens body 202 and lens body 302 comprise a curved substrate having a curved surface. The curved surface is preferably made of glass. Layer 101, 201 and 301 are polymer layers. Layer 103, 203 and 303 are preferably polymer layers. The afore mentioned polymer layers may have any combination of (different) material types as indicated in the range of material properties in the sub claims. Diaphragm is preferably between surfaces 102 and 103, between surfaces 202 and 203 but in other embodiments other positions, such as one or more of 301 and 302, 401 and 402, and between cover glass 500 and the image sensor 600, are also possible. In the present lens system 1 one or more integrated intermediate substrates, IR filters, UV filters, apertures and diaphragms, or combinations thereof have not been shown. The optical properties within one lens group may not be the same, this means that for example the optical properties for lens element 101 differ from the one used for lens element 103. The same applies for lens element 201 and lens element 203, and for lens element 301 and lens element 303.

Preferred embodiments of the present invention have been formulated in the dependent claims.

Figure 2:
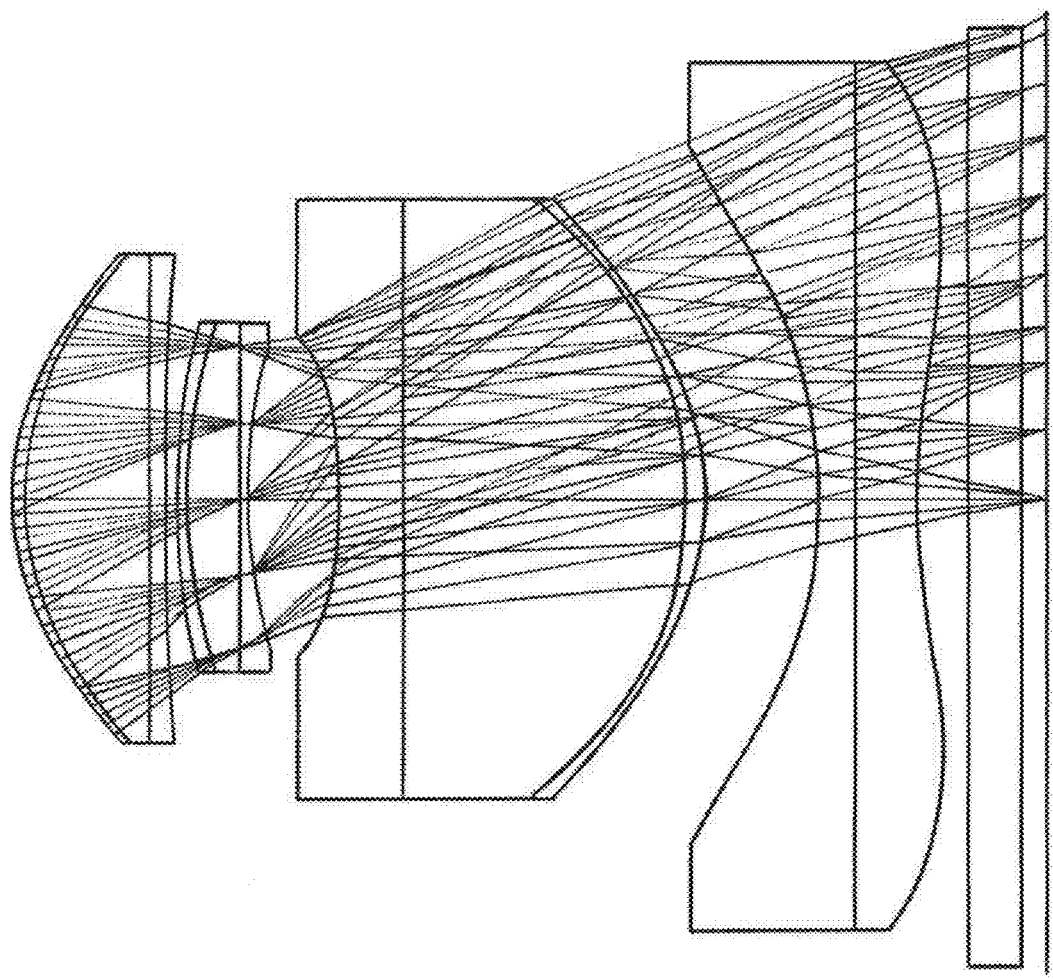
FIG. 2 shows a ray tracing model for the present lens system shown in FIG. 1.
Figure 3:
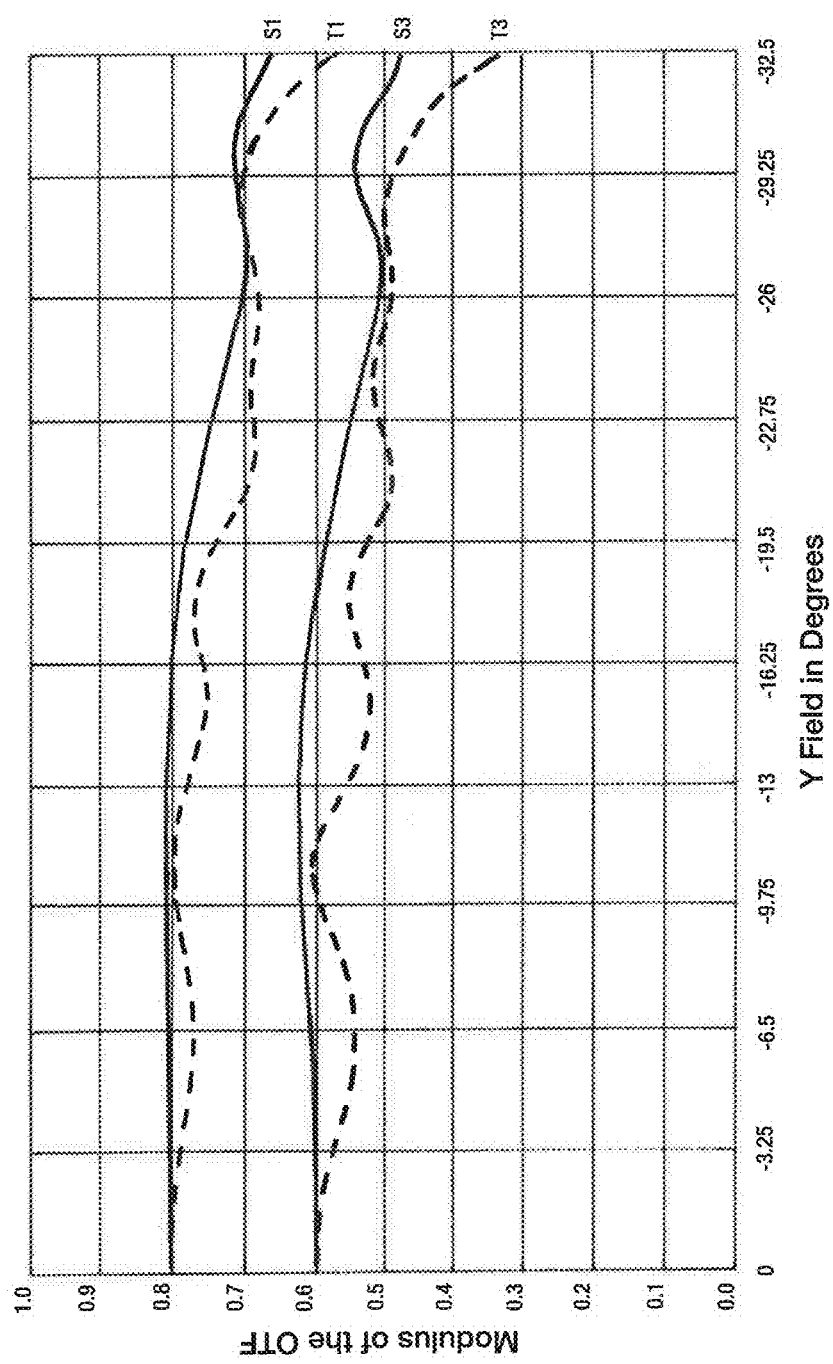
FIG. 3 shows the MTF vs. frequency of the lens system according to FIG. 1.

FIG. 2 shows a ray tracing model for the present lens system shown in both FIG. 1. FIG. 3 shows the MTF vs. frequency of the lens system according to FIG. 1. FIG. 3 shows two situations, i.e., a frequency of 110 cyc/mm (the upper curves) and a frequency of 225 cyc/mm (the lower curves). Such a lens system comprising four lens groups is characterized by high nominal performance, high performance after tolerances. According to the present invention the value of the Field (horizontal axis) at 45° is preferably higher than 0.5, especially in a range of 0.5 and 0.6 for a frequency of 225. According to the present invention at a value of the field of view (horizontal axis) at 45° the modulus of the OTF preferably higher than 0.7, especially in a range of 0.7 and 0.8 for a frequency of 110. These values are different from the values disclosed in the above discussed US 2013/265459. In US 2013/265459 at a value of the field of view at 45° the modulus of the OTF is much lower than 0.46, namely between 0.3 and 0.45 for a frequency of 225. And at the value of the field of view at 45° the modulus of the OTF is lower than 0.7 for a frequency of 110.

FIG. 4 shows an embodiment of a lens system 2 comprising three lenses groups 1000, 2000 and 3000 according to the present invention. The lens groups are arranged in order from an object side toward an image side surface side. The first lens group 1000 (identified as Lens1) comprises material A in layer 1001, material B in lens body 1002 and material C in layer 1003. The second lens group 2000 (identified as Lens2) comprises material A in layer 2001, material B in lens body 2002 and material C in layer 2003. The third lens group 3000 (identified as Lens3) comprises material A in layer 3001 and material B in layer 3002. Lens system 2 further comprises a cover glass 5000 and an image sensor 6000.

In an embodiment of the present invention lens body 1002 and lens body 2002 comprise a curved substrate having a curved surface. The curved surface is preferably made of glass. Layer 1001 and 2001 are polymer layers. Layer 1003 and 2003 are preferably polymer layers. The afore mentioned polymer layers may have any combination of (different) material types as indicated in the range of material properties in the sub claims. Diaphragm is preferably between surfaces 1002 and 1003, between surfaces 2002 and 2003 but in other embodiments other positions, such as one or more of 3001 and 3002 and between cover glass 5000 and the image sensor 6000, are also possible. In the present lens system 2 one or more integrated intermediate substrates, IR filters, UV filters, apertures and diaphragms, or combinations thereof have not been shown. The optical properties within one lens group may not be the same, this means that for example the optical properties for lens element 1001 differ from the one used for lens element 1003. The same applies for lens element 2001 and lens element 2003, and for lens element 3001 and lens element 3002.

Figure 5:
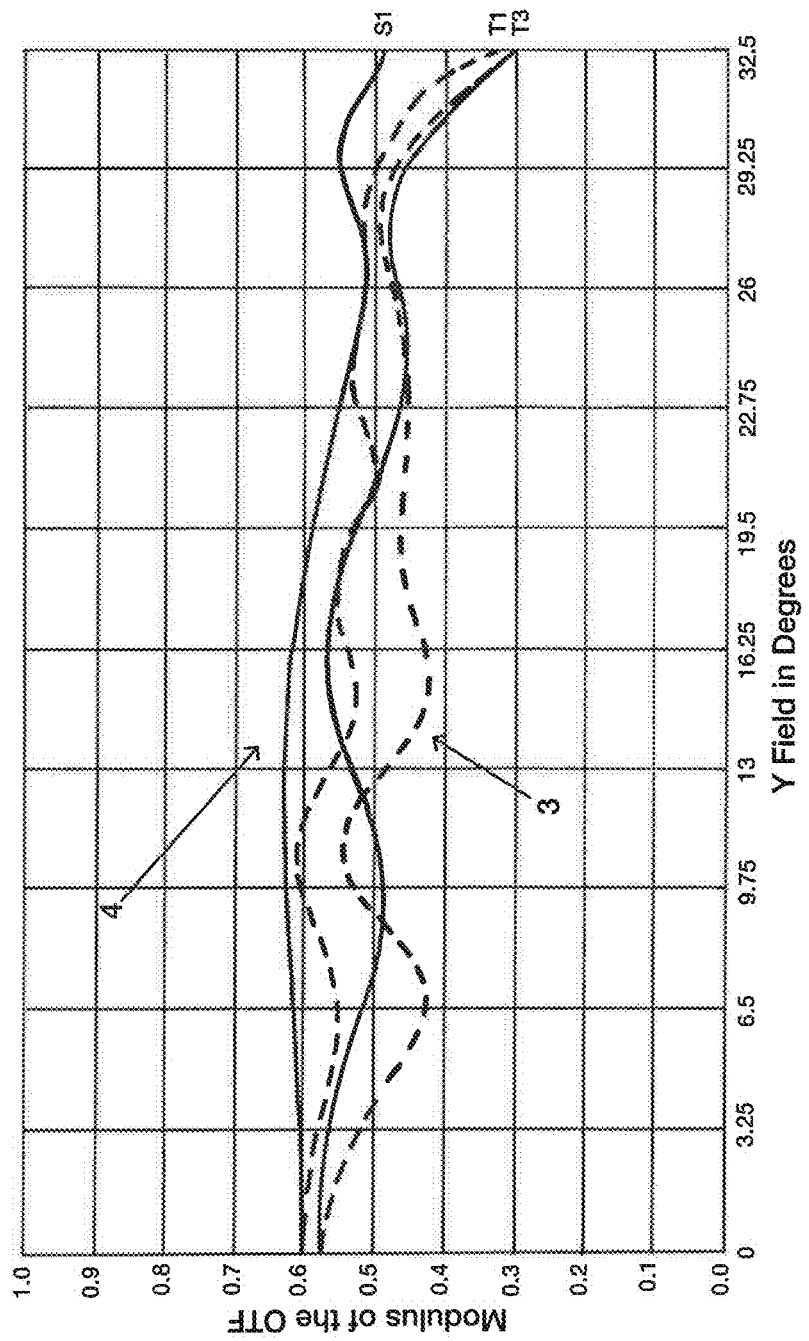
FIG. 5 shows the MTF vs. frequency of the lens system according to FIG. 4.

FIG. 5 shows the MTF vs. frequency of the lens system comprising three lenses groups according to FIG. 4. Such a lens system comprising three lenses groups is characterized by high nominal performance, high performance after tolerances. The upper curve refers to 4 lens groups MTF, the lower curve to 3 lens groups MTF.

FIG. 6 shows the optical table for a lens system comprising three lens groups according to the invention.

FIG. 7 shows the optical table for a lens system comprising four lens groups according to the invention. The numbering from the Zemax table shown in FIGS. 6 and 7 and that of the labels applied in the present Figures do not match.

The present lenses are groups of contiguous lens elements cemented together by replication technology, for example manufactured according to WO 2009/048320 A1. The contents of WO 2009/048320 are considered to be incorporated here in its entirety.

The thickness of the polymer layer is designed for maximum 300 microns thickness. This is sufficient to achieve the desired lens shape without affecting the thermal stability of the optical performance. Thermal instability is caused by the high CTE of the optical polymers (>30 ppm/K) compared to glass surfaces (<10 ppm/K). In addition, the present optical unit comprising four lens groups shows high manufacturing tolerances and a good MTF.

Surface Data Detail (A Lens System Comprising Four Lens Groups According to the Invention):
Surface OBJ STANDARD
Surface 1 EVENASPH Lens1 A
Coefficient on $r^2$: 0
Coefficient on $r^4$: 0.02073967
Coefficient on $r^6$: 0.021569812
Coefficient on $r^8$: −0.035164538
Coefficient on $r^{10}$: 0.031644054
Coefficient on $r^{12}$: −0.016450493
Coefficient on $r^{14}$: 0.0025477208
Coefficient on $r^{16}$: 0.0003843807
Surface 2 EVENASPH Lens1 B
Coefficient on $r^2$: 0
Coefficient on $r^4$: 0
Coefficient on $r^6$: 0
Coefficient on $r^8$: 0
Coefficient on $r^{10}$: 0
Coefficient on $r^{12}$: 0
Coefficient on $r^{14}$: 0
Coefficient on $r^{16}$: 0
Aperture: Floating Aperture
Maximum Radius 1.41
Surface 3 STANDARD Lens1 C
Aperture: Floating Aperture
Maximum Radius: 1.41
Surface 4 EVENASPH
Coefficient on $r^2$: 0
Coefficient on $r^4$: −0.025238296
Coefficient on $r^6$: −0.030514088
Coefficient on $r^8$: 0.14784406
Coefficient on $r^{10}$: −0.24904109
Coefficient on $r^{12}$: 0.219848
Coefficient on $r^{14}$: −0.099177548
Coefficient on $r^{16}$: 0.018792558
Surface 5 EVENASPH Lens2 A
Coefficient on $r^2$: 0
Coefficient on $r^4$: −0.030413879
Coefficient on $r^6$: 0.016053059
Coefficient on $r^8$: 0.065094267
Coefficient on $r^{10}$: −0.025951214
Coefficient on $r^{12}$: −0.069239021
Coefficient on $r^{14}$: 0.096809183
Coefficient on $r^{16}$: −0.030885419
Aperture: Floating Aperture
Maximum Radius: 1
Surface 6 EVENASPH Lens2 B
Coefficient on $r^2$: 0
Coefficient on $r^4$: 0
Coefficient on $r^6$: 0
Coefficient on $r^8$: 0
Coefficient on $r^{10}$: 0
Coefficient on $r^{12}$: 0
Coefficient on $r^{14}$: 0
Coefficient on $r^{16}$: 0
Aperture: Floating Aperture
Maximum Radius: 1
Surface 7 STO STANDARD Aperture
Surface 8 STANDARD Lens2 C
Aperture: Floating Aperture
Maximum Radius: 1
Surface 9 EVENASPH
Coefficient on $r^2$: 0
Coefficient on $r^4$: −0.0091227423
Coefficient on $r^6$: 0.038416261
Coefficient on $r^8$: −0.014524684
Coefficient on $r^{10}$: −0.023154004
Coefficient on $r^{12}$: −0.050784195
Coefficient on $r^{14}$: 0.22416434
Coefficient on $r^{16}$: −0.17725224
Surface 10 EVENASPH Lens3 A
Coefficient on $r^2$: 0
Coefficient on $r^4$: −0.052083887
Coefficient on $r^6$: 0.0374764
Coefficient on $r^8$: −0.12055997
Coefficient on $r^{10}$: 0.11334096
Coefficient on $r^{12}$: 0.0080938945
Coefficient on $r^{14}$: −0.10021303
Coefficient on $r^{16}$: 0.0451033
Surface 11 STANDARD Lens3 B
Aperture: Floating Aperture
Maximum Radius: 1.72
Surface 12 EVENASPH Lens3 C
Coefficient on $r^2$: 0
Coefficient on $r^4$: 0
Coefficient on $r^6$: 0

Coefficient on r^8: 0
Coefficient on r^10: 0
Coefficient on r^12: 0
Coefficient on r^14: 0
Coefficient on r^16: 0
Aperture: Floating Aperture
Maximum Radius: 1.72
Surface 13 EVENASPH
Coefficient on r^2: 0
Coefficient on r^4: 0.015145707
Coefficient on r^6: −0.0069013393
Coefficient on r^8: 0.00074194888
Coefficient on r^10: 2.9320512e-005
Coefficient on r^12: 0.00042062296
Coefficient on r^14: −0.00016262301
Coefficient on r^16: 1.8277182e-005
Aperture: Floating Aperture
Maximum Radius: 1.72
Surface 14 EVENASPH Lens4 A
Coefficient on r^2: 0
Coefficient on r^4: −0.054648888
Coefficient on r^6: 0.021022479
Coefficient on r^8: −0.002700377
Coefficient on r^10: −2.8070393e-005
Coefficient on r^12: 4.5940096e-005
Coefficient on r^14: 1.2439457e-006
Coefficient on r^16: −8.8421409e-007
Surface 15 STANDARD Lens4 B
Aperture: Floating Aperture
Maximum Radius: 2.5
Surface 16 EVENASPH
Coefficient on r^2: 0
Coefficient on r^4: −0.077671238
Coefficient on r^6: 0.01975526
Coefficient on r^8: −0.0027659834
Coefficient on r^10: −7.6235332e-005
Coefficient on r^12: 5.3783853e-005
Coefficient on r^14: −3.4670944e-006
Coefficient on r^16: 2.9394733e-009
Aperture: Floating Aperture
Maximum Radius: 2.5
Surface 17 STANDARD Cover glass
Surface 18 STANDARD
Surface 19 IMA STANDARD
Surface Data Detail (A Lens System Comprising Three Lens Groups According to the Invention):
SURFACE DATA DETAIL:
Surface OBJ STANDARD
Surface 1 EVENASPH Lens1 A
Coefficient on r^2: 0
Coefficient on r^4: 0.0019065606
Coefficient on r^6: −0.0099878808
Coefficient on r^8: 0.17155845
Coefficient on r^10: −0.43148215
Coefficient on r^12: 0.52083743
Coefficient on r^14: −0.30329861
Coefficient on r^16: 0.070506695
Aperture: Floating Aperture
Maximum Radius: 1.19
Surface 2 STANDARD Lens1 B
Aperture: Floating Aperture
Maximum Radius 1.19
Surface 3 STO STANDARD Lens1 C
Aperture: Floating Aperture
Maximum Radius: 1.19
Surface 4 EVENASPH
Coefficient on r^2: 0
Coefficient on r^4: 0.026074464
Coefficient on r^6: 0.045511582
Coefficient on r^8: 0.10123878
Coefficient on r^10: −0.88076679
Coefficient on r^12: 2.2654847
Coefficient on r^14: −2.4831452
Coefficient on r^16: 1.0333396
Surface 5 EVENASPH Lens2 A
Coefficient on r^2: 0
Coefficient on r^4: −0.094943263
Coefficient on r^6: 0.12297449
Coefficient on r^8: −0.32813015
Coefficient on r^10: 0.28975634
Coefficient on r^12: −0.040717456
Coefficient on r^14: −0.1277611
Coefficient on r^16: 0.038841237
Surface 6 STANDARD Lens2 B
Aperture: Floating Aperture
Maximum Radius: 1.62
Surface 7 STANDARD Lens2 C
Aperture: Floating Aperture
Maximum Radius: 1.62
Surface 8 EVENASPH
Coefficient on r^2: 0
Coefficient on r^4: −0.054421138
Coefficient on r^6: 0.02029859
Coefficient on r^8: −0.020070593
Coefficient on r^10: 0.010395231
Coefficient on r^12: −0.0036402038
Coefficient on r^14: 0.00066787049
Coefficient on r^16: −7.1782481e-005
Aperture: Floating Aperture
Maximum Radius: 1.62
Surface 9 EVENASPH Lens3 A
Coefficient on r^2: 0
Coefficient on r^4: −0.2356588
Coefficient on r^6: 0.10837249
Coefficient on r^8: −0.035475831
Coefficient on r^10: 0.00070673088
Coefficient on r^12: 0.0065407411
Coefficient on r^14: −0.0033118596
Coefficient on r^16: 0.000517159
Surface 10 STANDARD Lens3 B
Aperture: Floating Aperture
Maximum Radius: 2.43
Surface 11 EVENASPH
Coefficient on r^2: 0
Coefficient on r^4: −0.058030208
Coefficient on r^6: 0.021138202
Coefficient on r^8: −0.0075325933
Coefficient on r^10: 0.0020277744
Coefficient on r^12: −0.00036898821
Coefficient on r^14: 3.5897533e-005
Coefficient on r^16: −1.312025e-006
Aperture: Floating Aperture
Maximum Radius: 2.43
Surface 12 STANDARD Cover glass
Surface 13 STANDARD
Surface 14 IMA STANDARD Sensor

The invention claimed is:

1. An optical unit comprising three lens groups, a first lens group, a second lens group and a third lens group, which are arranged in order from an object side toward an image side surface side, wherein one or more of said lens groups comprise a substrate having a curved optical surface, wherein said curved optical surface is provided with a polymer layer, wherein at least one additional fourth lens group is added in an optical unit, wherein said first lens group has positive refraction power, especially said second lens group has positive refraction power, especially said third lens group has positive refraction power and especially said fourth lens group has negative refraction power, wherein the order from an object side toward an image side surface side is: first lens group, second lens group, third lens group and fourth lens group, said fourth lens group here being a lens group comprising two lens elements, wherein said two lens elements within said lens group have different optical properties, wherein in said third lens group no glass substrate is present, wherein said first lens group, said second lens group and said third lens group each comprise a substrate having a curved optical surface, wherein said curved optical surface is provided with a polymer layer, wherein a focal length of the integral optical camera lens is f, a focal length of said first lens group is f1, a focal length of said second lens group is f2, a focal length of said third lens group is f3, a focal length of said fourth lens group is f4, which satisfy following relational expressions:

$0.5 < f1/f < 0.98;$ $20 < f2/f < 35;$ $0.5 < f3/f < 1;$ $-1 < f4/f < -0.1.$

2. An optical unit according to claim 1, wherein said first lens group and said second lens group each comprise a curved substrate having a curved surface.

3. An optical unit according to claim 2, wherein said curved substrate is made of glass.

4. An optical unit according to claim 1, wherein said polymer layer has been manufactured according replication technology.

5. An optical unit according to claim 1, wherein the thickness of at least one of said polymer layers is in a range of 10-300 micro meter, preferably in a range of 25-200 micro meter.

6. An optical unit according to claim 1, wherein said first lens group further comprises another polymer layer, said another polymer layer positioned adjacent to said curved substrate facing away from said curved surface.

7. An optical unit according to claim 1, wherein said second lens group further comprises another polymer layer, said another polymer layer positioned adjacent to said curved substrate facing away from said curved surface.

8. An optical unit according to claim 6, wherein said another polymer layer has been manufactured according replication technology.

9. An optical unit according to claim 1, wherein said third lens group comprises two lens elements, wherein said two lens elements within said third lens group have different optical properties, wherein in said third lens group no glass substrate is present.

10. An optical unit according to claim 9, wherein each of said two lens elements within said third lens group have been manufactured according replication technology.

11. An optical unit according to claim 1, wherein said additional fourth lens group is positioned between said first lens group and said second lens group.

12. An optical unit according to claim 1, wherein said additional fourth lens group comprises a curved substrate having a curved surface, wherein said curved optical surface is provided with a polymer layer, wherein said curved substrate is preferably made of glass.

13. An optical unit according to claim 1, wherein no flat glass support is present in at least one or more of said first, second, third and additional lens groups.

14. An optical unit according to claim 1, wherein said first lens group has a positive refraction power, especially said second lens group has a positive refraction power, especially said third lens group has a negative refraction power.

15. An optical unit according to claim 1, wherein a focal length of the integral optical camera lens is f, a focal length of said first lens group is f1, a focal length of said second lens group is f2, a focal length of said third lens group is f3, which satisfy following relational expressions:

$0.5 < f1/f < 1;$ $0.5 < f2/f < 1;$ $-1 < f3/f < -0.1.$

16. An optical unit according to claim 1, wherein the range of index (n) and Abbe properties in said first lens group are:

$1.5 < n < 1.8, 40 < Abbe < 80$ (A)

$1.4 < n < 1.8, 60 < Abbe < 90$ (B)

(C) $1.5 < n < 1.8, 20 < Abbe < 40$, wherein the term "A" refers to a lens element toward an object side, the term (B) refers to a curved substrate, and the term "C" refers to a lens element towards an image surface side.

17. An optical unit according to claim 1, wherein the range of index (n) and Abbe properties in said second lens group are:

$1.5 < n < 1.8, 20 < Abbe < 40$ (A)

$1.4 < n < 1.8, 40 < Abbe < 80$ (B)

(C) $1.5 < n < 1.8, 40 < Abbe < 80$, wherein the term "A" refers to a lens element toward an object side, the term (B) refers to a curved substrate, and the term "C" refers to a lens element towards an image surface side.

18. An optical unit according to claim 1, wherein the range of index (n) and Abbe properties in said third lens group are:

$1.4 < n < 1.7, 30 < Abbe < 60$ (A)

(C) $1.5 < n < 1.8, 20 < Abbe < 50$, wherein the term "A" refers to a lens element toward an object side and the term "C" refers to a lens element towards an image surface side.

19. An optical unit according to claim 1, wherein the range of index (n) and Abbe properties in said first lens group are:

$1.5 < n < 1.8, 40 < Abbe < 80$ (A)

$1.4 < n < 1.8, 60 < Abbe < 90$ (B)

(C) $1.5 < n < 1.8, 20 < Abbe < 40$, wherein the term "A" refers to a lens element toward an object side, the term (B) refers to a curved substrate, and the term "C" refers to a lens element towards an image surface side.

20. The optical unit according to claim 1, wherein the range of index (n) and Abbe properties in said second lens group are:

$1.5 < n < 1.8, 40 < Abbe < 80$ (A)

$1.6 < n < 1.85, 30 < Abbe < 50$ (B)

(C) $1.5 < n < 1.8, 20 < Abbe < 40$, wherein the term "A" refers to a lens element toward an object side, the term (B)

refers to a curved substrate, and the term "C" refers to a lens element towards an image surface side.

21. The optical unit according to claim 1, wherein the range of index (n) and Abbe properties in said third lens group are:

$1.5 < n < 1.8, 20 < Abbe < 40$ (A)

$1.4 < n < 1.8, 40 < Abbe < 80$ (B)

(C) $1.5 < n < 1.8, 40 < Abbe < 80$, wherein the term "A" refers to a lens element toward an object side, the term (B) refers to a curved substrate, and the term "C" refers to a lens element towards an image surface side.

22. The optical unit according to claim 1, wherein the range of index (n) and Abbe properties in said fourth lens group are:

$1.4 < n < 1.7, 30 < Abbe < 60$ (A)

$1.5 < n < 1.8, 20 < Abbe < 40$ (C)

wherein the term "A" refers to a lens element toward an object side and the term "C" refers to a lens element towards an image surface side.

23. The optical unit according to claim 1, wherein in one or more of said four lenses groups one or more additional layers are present, chosen from the group of integrated intermediate substrates, IR filters, UV filters, apertures and diaphragms, or combinations thereof.

24. The optical unit according to claim 1, wherein the materials of each of said polymer layer(s) are chosen from the group of UV curable polymers, preferably epoxy, acrylic and nylon type polymers.

25. A stack of a lens assembly, wherein said stack comprises an optical unit according to claim 1.

26. The stack according to claim 25, wherein said individual four lenses groups from said optical unit are stacked by using spacers and/or adhesives.

27. The stack according to claim 25, further comprising one or more of an image sensor, a sensor cover plate and a cover plate.

28. The stack according to claim 25, wherein a ratio between the Z-height and the length of the diagonal of the image sensor in a stack is lower than 1.1, and higher than 0.9.

29. The stack according to claim 25, wherein at a field of view at 45° the modulus of the OTF is higher than 0.5 and lower than 0.6, measured at a frequency of 225, for a lens system comprising four lens groups.

30. The stack according to claim 25, wherein at a field of view at 45° the modulus of the OTF is higher than 0.7, and lower than 0.8 for a frequency of 110, for a lens system comprising four lens groups.

31. An optical unit comprising three lens groups, a first lens group, a second lens group and a third lens group, which are arranged in order from an object side toward an image side surface side, wherein one or more of said lens groups comprise a substrate having a curved optical surface, wherein said curved optical surface is provided with a polymer layer, wherein at least one additional fourth lens group is added in an optical unit, wherein said first lens group has positive refraction power, especially said second lens group has positive refraction power, especially said third lens group has positive refraction power and especially said fourth lens group has negative refraction power, wherein the order from an object side toward an image side surface side is: first lens group, second lens group, third lens group and fourth lens group, said fourth lens group here being a lens group comprising two lens elements, wherein said two lens elements within said lens group have different optical properties, wherein in said third lens group no glass substrate is present, wherein said first lens group, said second lens group and said third lens group each comprise a substrate having a curved optical surface, wherein said curved optical surface is provided with a polymer layer, wherein the range of index (n) and Abbe properties in said first lens group are:

$1.5 < n < 1.8, 40 < Abbe < 80$ (A)

$1.4 < n < 1.8, 60 < Abbe < 90$ (B)

(C) $1.5 < n < 1\ 20 < Abbe < 40$, wherein the term "A" refers to a lens element toward an object side, the term "B" refers to a curved substrate and the term "C" refers to a lens element towards an image surface side.

32. An optical unit according to claim 31, wherein said first lens group and said second lens group each comprise a curved substrate having a curved surface.

33. An optical unit according to claim 32, wherein said curved substrate is made of glass.

34. An optical unit according to claim 31, wherein said polymer layer has been manufactured according replication technology.

35. An optical unit according to claim 31, wherein the thickness of at least one of said polymer layers is in a range of 10-300 micro meter, preferably in a range of 25-200 micro meter.

36. An optical unit according to claim 31, wherein said first lens group further comprises another polymer layer, said another polymer layer positioned adjacent to said curved substrate facing away from said curved surface.

37. An optical unit according to claim 36, wherein said another polymer layer has been manufactured according replication technology.

38. An optical unit according to claim 31, wherein said second lens group further comprises another polymer layer, said another polymer layer positioned adjacent to said curved substrate facing away from said curved surface.

39. An optical unit according to claim 31, wherein said third lens group comprises two lens elements, wherein said two lens elements within said third lens group have different optical properties, wherein in said third lens group no glass substrate is present.

40. An optical unit according to claim 39, wherein each of said two lens elements within said third lens group have been manufactured according replication technology.

41. An optical unit according to claim 31, wherein said additional fourth lens group is positioned between said first lens group and said second lens group.

42. An optical unit according to claim 31, wherein said additional fourth lens group comprises a curved substrate having a curved surface, wherein said curved optical surface is provided with a polymer layer, wherein said curved substrate is preferably made of glass.

43. An optical unit according to claim 31, wherein no flat glass support is present in at least one or more of said first, second, third and additional lens groups.

44. An optical unit according to claim 31, wherein said first lens group has a positive refraction power, especially said second lens group has a positive refraction power, especially said third lens group has a negative refraction power.

45. An optical unit according to claim 31, wherein a focal length of the integral optical camera lens is f, a focal length of said first lens group is f1, a focal length of said second lens group is f2, a focal length of said third lens group is f3, which satisfy following relational expressions:

$$0.5 < f1/f < 1;$$

$$0.5 < f2/f < 1;$$

$$-1 < f3/f < -0.1.$$

46. An optical unit according to claim 31, wherein the range of index (n) and Abbe properties in said first lens group are:

$$1.5 < n < 1.8, 40 < \text{Abbe} < 80 \quad (A)$$

$$1.4 < n < 1.8, 60 < \text{Abbe} < 90 \quad (B)$$

(C) 1.5<n<1.8, 20<Abbe<40, wherein the term "A" refers to a lens element toward an object side, the term (B) refers to a curved substrate, and the term "C" refers to a lens element towards an image surface side.

47. An optical unit according to claim 31, wherein the range of index (n) and Abbe properties in said second lens group are:

$$1.5 < n < 1.8, 20 < \text{Abbe} < 40 \quad (A)$$

$$1.4 < n < 1.8, 40 < \text{Abbe} < 80 \quad (B)$$

(C) 1.5<n<1.8, 40<Abbe<80, wherein the term "A" refers to a lens element toward an object side, the term (B) refers to a curved substrate, and the term "C" refers to a lens element towards an image surface side.

48. An optical unit according to claim 31, wherein the range of index (n) and Abbe properties in said third lens group are:

$$1.4 < n < 1.7, 30 < \text{Abbe} < 60 \quad (A)$$

(C) 1.5<n<1.8, 20<Abbe<50, wherein the term "A" refers to a lens element toward an object side and the term "C" refers to a lens element towards an image surface side.

49. An optical unit according to claim 31, wherein a focal length of the integral optical camera lens is f, a focal length of said first lens group is f1, a focal length of said second lens group is f2, a focal length of said third lens group is f3, a focal length of said fourth lens group is f4, which satisfy following relational expressions:

$$0.5 < f1/f < 0.98;$$

$$20 < f2/f < 35;$$

$$0.5 < f3/f < 1;$$

$$-1 < f4/f < -0.1.$$

50. The optical unit according to claim 31, wherein the range of index (n) and Abbe properties in said second lens group are:

$$1.5 < n < 1.8, 40 < \text{Abbe} < 80 \quad (A)$$

$$1.6 < n < 1.85, 30 < \text{Abbe} < 50 \quad (B)$$

(C) 1.5<n<1.8, 20<Abbe<40, wherein the term "A" refers to a lens element toward an object side, the term (B) refers to a curved substrate, and the term "C" refers to a lens element towards an image surface side.

51. The optical unit according to claim 31, wherein the range of index (n) and Abbe properties in said third lens group are:

$$1.5 < n < 1.8, 20 < \text{Abbe} < 40 \quad (A)$$

$$1.4 < n < 1.8, 40 < \text{Abbe} < 80 \quad (B)$$

(C) 1.5<n<1.8, 40<Abbe<80, wherein the term "A" refers to a lens element toward an object side, the term (B) refers to a curved substrate, and the term "C" refers to a lens element towards an image surface side.

52. The optical unit according to claim 31, wherein the range of index (n) and Abbe properties in said fourth lens group are:

$$1.4 < n < 1.7, 30 < \text{Abbe} < 60 \quad (A)$$

$$1.5 < n < 1.8, 20 < \text{Abbe} < 40 \quad (C)$$

wherein the term "A" refers to a lens element toward an object side and the term "C" refers to a lens element towards an image surface side.

53. The optical unit according to claim 31, wherein in one or more of said four lenses groups one or more additional layers are present, chosen from the group of integrated intermediate substrates, IR filters, UV filters, apertures and diaphragms, or combinations thereof.

54. The optical unit according to claim 31, wherein the materials of each of said polymer layer(s) are chosen from the group of UV curable polymers, preferably epoxy, acrylic and nylon type polymers.

55. A stack of a lens assembly, wherein said stack comprises an optical unit according to claim 34.

56. The stack according to claim 55, wherein said individual four lenses groups from said optical unit are stacked by using spacers and/or adhesives.

57. The stack according to claim 55, further comprising one or more of an image sensor, a sensor cover plate and a cover plate.

58. The stack according to claim 55, wherein a ratio between the Z-height and the length of the diagonal of the image sensor in a stack is lower than 1.1, and higher than 0.9.

59. The stack according to claim 55, wherein at a field of view at 45° the modulus of the OTF is higher than 0.5 and lower than 0.6, measured at a frequency of 225, for a lens system comprising four lens groups.

60. The stack according to claim 55, wherein at a field of view at 45° the modulus of the OTF is higher than 0.7, and lower than 0.8 for a frequency of 110, for a lens system comprising four lens groups.

* * * * *